United States Patent
Pan et al.

(10) Patent No.: US 7,529,189 B2
(45) Date of Patent: May 5, 2009

(54) MECHANISM FOR IMPOSING A CONSISTENT DELAY ON INFORMATION SETS RECEIVED FROM A VARIABLE RATE INFORMATION STREAM

(75) Inventors: Eric Pan, Irvine, CA (US); Johnson Sebeni, Fremont, CA (US); Huoy-Bing Lim, Fremont, CA (US)

(73) Assignee: Via Technologies, Inc., Taipei (TW)

( * ) Notice: Subject to any disclaimer, the term of this patent is extended or adjusted under 35 U.S.C. 154(b) by 604 days.

(21) Appl. No.: 11/239,710

(22) Filed: Sep. 29, 2005

(65) Prior Publication Data

US 2007/0071022 A1   Mar. 29, 2007

(51) Int. Cl.
*G08C 15/00* (2006.01)
*H04L 12/46* (2006.01)
*H04L 12/54* (2006.01)

(52) U.S. Cl. .................. 370/232; 370/235; 370/412; 370/429

(58) Field of Classification Search ............... 370/235, 370/428, 429
See application file for complete search history.

(56) References Cited

U.S. PATENT DOCUMENTS

| | | | | | |
|---|---|---|---|---|---|
| 5,640,388 | A | * | 6/1997 | Woodhead et al. | 370/468 |
| 5,796,719 | A | * | 8/1998 | Peris et al. | 370/231 |
| 5,844,885 | A | * | 12/1998 | Grob et al. | 370/216 |
| 6,728,270 | B1 | * | 4/2004 | Meggers et al. | 370/514 |
| 6,977,942 | B2 | * | 12/2005 | Raisanen | 370/429 |
| 2003/0112758 | A1 | * | 6/2003 | Pang et al. | 370/235 |
| 2004/0170186 | A1 | * | 9/2004 | Shao et al. | 370/412 |
| 2006/0198384 | A1 | * | 9/2006 | Gresham | 370/412 |

OTHER PUBLICATIONS

Qualcomm Incorporated, entitled "Commonalities between CDMA2000 and WCDMA Technologies", dated Oct. 2006—(50 pages).
Ericsson, entitled "Innovations in WCDMA", dated Mar. 2008, © Ericsson 2008 Public—(28 pages).

* cited by examiner

*Primary Examiner*—Hassan Kizou
*Assistant Examiner*—Ryan C Kavleski
(74) *Attorney, Agent, or Firm*—Bobby K. Truong; Hickman Palermo Truong & Becker LLP

(57) ABSTRACT

A mechanism is disclosed for imposing a delay on a variable rate information stream. A stream of information sets is received, where the stream has a variable information rate that can change from time period to time period. In a first time period, information sets are stored into a first buffer. In a second time period, information sets are stored into a second buffer. Because of the variable information rate, the number of information sets stored into the first and second buffers may differ. After a delay period has elapsed since the beginning of the first time period, the information sets in the first buffer are outputted. After a delay period has elapsed since the beginning of the second time period, the information sets in the second buffer are outputted. In this manner, a consistent delay is imposed on the information sets regardless of the information rate of the stream.

34 Claims, 3 Drawing Sheets

US 7,529,189 B2

MECHANISM FOR IMPOSING A CONSISTENT DELAY ON INFORMATION SETS RECEIVED FROM A VARIABLE RATE INFORMATION STREAM

BACKGROUND

The CDMA (code division multiple access) standard has been used for quite some time to carry out wireless communication between transmitters and receivers (e.g. between base stations and cellular phones). With CDMA, it is possible, through the use of multiple spreading codes, for multiple users to share the same frequency. While CDMA has been effective, it is now reaching its upper limits in terms of traffic carrying capability. In an attempt to increase the amount of information that can be sent wirelessly during the same amounts of time, a new standard known as WCDMA (wideband code division multiple access) has been developed. With WCDMA, it is possible to vary the spreading factors applied to various sets of information. It is also possible to send information on multiple channels to the same user. With these and other capabilities, WCDMA is able to carry more traffic than traditional CDMA.

With WCDMA, a combination of spreading and scrambling is used to effect wireless communication. On the transmitter side, information may be processed as follows. Initially, one or more sets of digital information are processed to derive one or more symbol information sets that represent the digital information. The symbol information sets have an I (in-phase) component and a Q (quadrature phase) component. Once derived, the symbol information sets are processed in accordance with a spreading factor. According to the current WCDMA standard, the spreading factor is variable and can range between 4 and 512 (this is in contrast to CDMA, where the spreading factor is a constant 64). The spreading factor defines the resolution (the spreading gain) of the information that it is used to spread. The greater the spreading factor, the more the resolution, and hence, the more precisely the information can be captured. Greater resolution comes with a tradeoff, however. The larger the spreading factor, the less information that can be sent in a single frame. To illustrate this point, according to the current WCDMA standard, a frame consists of 38,400 chip times or chip cycles (the chip rate is 3.84 MHz, so one chip time or chip cycle is 1/3.84M). If the spreading factor is 4 (meaning that a set of symbol information is spread over 4 chip times), then the maximum number of sets of symbol information that can be sent in a single frame is 38,400/4 or 9,600. In contrast, if the spreading factor is 256 (meaning that a set of symbol information is spread over 256 chip times), then only 38,400/256 or 150 sets of symbol information will be able to be sent in a single frame. Thus, the choice of a spreading factor involves the balancing of the amount of information that is desired to be sent and the precision that is desired for the information. In WCDMA, the spreading factor in certain data channels is variable and can change from frame to frame. Since the spreading factor can change, and since the spreading factor affects the number of symbol information sets that can be sent in a single frame, this means that the number of symbol information sets that can be sent in a single frame can change from frame to frame (i.e. from time period to time period).

After a spreading factor is applied to the symbol information sets to derive a set of spreaded information sets, a scrambling code is applied to the spreaded information sets to derive a set of scrambled information sets. The scrambling code is unique to a particular receiver; thus, after the scrambled information sets are derived, only the particular receiver will be able to decipher and comprehend the scrambled information sets. Thereafter, the scrambled information sets are converted into analog RF (radio frequency) signals, and sent out on one or more antennas.

On the receiver side, the opposite process is carried out. Specifically, the receiver receives the RF signals and converts them back into digital signals. The digital signals are then descrambled using the scrambling code to derive a set of descrambled information sets. The descrambled information sets are then de-spreaded using an appropriate spreading factor to derive a set of de-spreaded information sets. The symbol information sets are then extracted from the de-spreaded information sets. If the transmission mechanism and medium were perfect, this set of symbol information sets would be the same as that on the transmitter side. However, because of such factors as channel distortion and antenna gain, the symbol information sets were probably altered in the course of transmission so that they are no longer the same as the symbol information sets on the transmitter side. To compensate for this, the receiver computes a set of compensation information, which may include channel compensation information and antenna gain information. This compensation information may be used to derive one or more compensation factors which may be processed with the symbol information sets to adjust them to compensate for the channel distortion and the antenna gain.

The derivation of the compensation factors takes time. Because of this, the symbol information sets cannot be processed right after they are extracted from the de-spreaded information sets. Rather, they need to be delayed until the compensation factors are derived. Thus, a delay mechanism is needed within the receiver.

While the concept of delaying the symbol information sets is simple, its implementation can be quite complex and difficult. Much of the difficulty stems from the fact that the rate at which symbol information sets are received can change from frame to frame. As noted above, different frames can have different spreading factors, and different spreading factors lead to different information rates (different numbers of symbol information sets being received during a frame). For example, in a first frame having a spreading factor of 4, 9600 symbol information sets may be received, while in a subsequent frame having a spreading factor of 256, 150 symbol information sets may be received. This large divergence in the number of information sets received from frame to frame makes it very difficult for a delay circuitry to impose a consistent delay on the information sets.

In one possible approach, a combination of a data buffer and a control circuitry may be used. The data buffer may be used to store the information sets, and the control circuitry may be used to control the storing, delaying, and outputting of the information sets from the buffer. This approach has a significant drawback in that it requires a highly complex and difficult-to-design control circuitry to properly control the timing of the storing and outputting of information sets from the buffer. This complex control circuitry would add undesired cost and complexity to the receiver. This approach also does not adjust very gracefully to the changes in spreading factor and the resultant changes in information rates from frame to frame. Because of these and other shortcomings, this possible approach does not provide satisfactory results. Hence, an improved delay mechanism is needed.

SUMMARY

In accordance with one embodiment of the present invention, there is provided an improved delay mechanism for enabling a consistent delay to be imposed on all information sets, even information sets that are received from a stream having a variable information rate that can change from time period to time period.

In one embodiment, the mechanism comprises a first buffer and a second buffer. The first buffer is used to store information sets received from a stream during a first time period, and the second buffer is used to store information sets received from the stream during a second time period. In one embodiment, the first and second time periods have the same duration, and the duration is sufficiently short that it is guaranteed that the information rate of the stream will not change during one of the time periods. The information rate may change between time periods, but it will not change during a time period. Thus, neither buffer will encounter the situation where it receives information sets at different information rates during the same time period. This makes control of the storing and outputting of information sets from the buffers much simpler.

In one embodiment, during the first time period, the stream is directed to the first buffer. The first buffer stores all of the information sets that it receives from the stream during this time period. A first count is maintained of the number (m) of information sets stored into the first buffer during the first time period. At the end of the first time period and the beginning of the second time period, the stream is redirected to the second buffer instead of the first buffer. The second buffer stores all of the information sets that it receives from the stream during the second time period. A second count is maintained of the number (n) of information sets stored into the second buffer during the second time period. Because the information rate of the stream can change between the two time periods, the number m of information sets stored into the first buffer during the first time period may be different than the number n of information sets stored into the second buffer during the second time period.

At some point, after a certain delay period has elapsed since the beginning of the first time period, the m number of information sets stored into the first buffer during the first time period are outputted from the first buffer. In addition, after the same delay period has elapsed since the beginning of the second time period, the n number of information sets stored into the second buffer during the second time period are outputted from the second buffer. In this manner, a consistent delay is imposed on the information sets of both buffers. This is achieved despite the fact that the information sets may have been received at different information rates, and it is accomplished without expensive and highly complex control circuitry. Thus, this delay mechanism represents a simple, elegant, and viable solution to the problem of imposing a consistent delay on information sets received from a stream having variable information rates.

DETAILED DESCRIPTION OF EMBODIMENTS(s)

Receiver Overview

Figure 1:
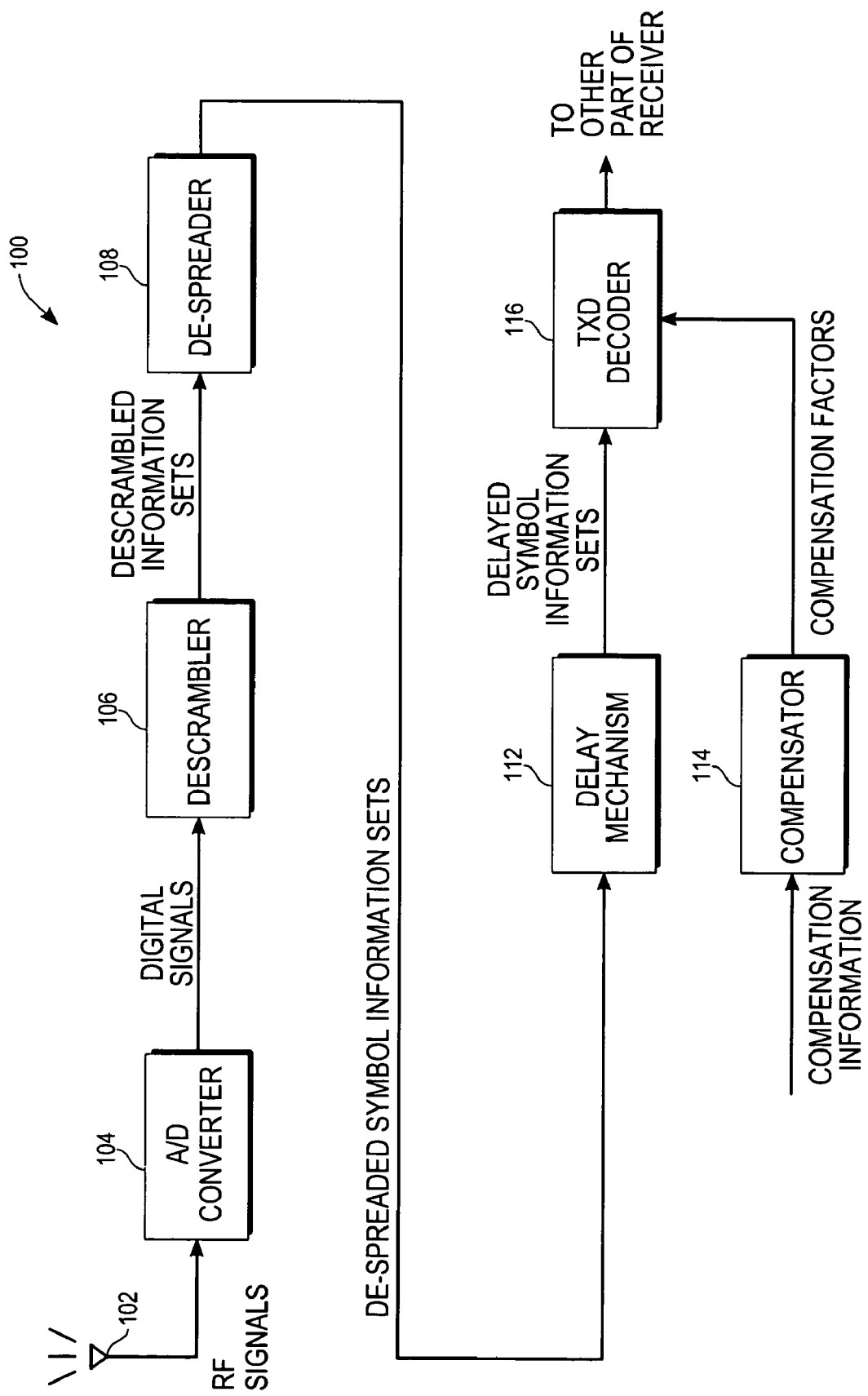
FIG. 1 shows a functional block diagram of a portion of a receiver in which one embodiment of the present invention may be implemented.

With reference to FIG. 1, there is shown a functional block diagram of a portion of a receiver in which one embodiment of the present invention may be implemented. The receiver portion 100 may, for example, be a portion of a finger of a rake receiver, which may have one or more fingers. For the sake of illustration, an embodiment of the present invention will be described below in the context of WCDMA. However, it should be noted that the invention is not so limited. Rather, the concepts taught herein may be applied generally to any situation in which it is desirable to impose a consistent delay on a plurality of information sets.

As shown in FIG. 1, the receiver portion 100 comprises a plurality of components including an antenna 102, an analog to digital converter 104, a descrambler 106, a de-spreader 108, a delay mechanism 112, a compensator 114, and a TXD decoder 116. For purposes of the present invention, the components 102-116 shown in FIG. 1 may be implemented in hardware, software (i.e. one or more processors executing instructions), or any combination thereof.

The antenna 102 receives a set of analog RF signals from a transmitter (e.g. a base station). For the sake of example, it will be assumed that the RF signals were derived on the transmitter end by applying a spreading factor and a scrambling code to a set of symbol information sets. Upon receiving the RF signals, the antenna 102 passes the signals to the A/D converter 104, which converts them into digital signals. The digital signals are then passed to the descrambler 106, which uses a scrambling code unique to the receiver to descramble the digital signals. In one embodiment, the scrambling code is a set of pseudo-random noise that has a duration of 38,400 chip times (this is a standard duration for a scrambling code under the current WCDMA standard).

After the digital signals are descrambled, the descrambled information sets are passed on to the de-spreader 108. As noted previously, in WCDMA, the spreading factor used is variable (between 4 and 512 according to the current WCDMA standard) and can change from frame to frame. Thus, when the de-spreader 108 encounters the beginning of a new frame, it determines the spreading factor used to spread information sets in that frame. It then uses that spreading factor to de-spread all of the information sets in that frame. When the de-spreader 108 encounters the next frame, it again determines the spreading factor used to spread information sets in that frame, and uses that spreading factor to de-spread all of the information sets in that frame. After the de-spreader 108 has performed its function, it passes the de-spreaded symbol information sets to the delay mechanism 112.

As is well known, air is an imperfect transmission medium. Consequently, the RF signals received by the antenna 102 are most likely not exactly the same as the RF signals sent by the transmitter. This in turn means that the de-spreaded information sets derived by the de-spreader 108 are probably not the same as the symbol information sets that were processed by the transmitter. To compensate for the imperfection of the transmission medium, the compensator 114 derives/computes a set of compensation factors. These factors may include, but are not limited to, a channel compensation factor and an antenna compensation factor. The compensation factors are derived/computed based upon one or more sets of compensation information, which provides an indication of how the symbol information sets may have been altered during the transfer from the transmitter to the receiver. Once derived/computed, the compensation factors may be used by the TXD decoder 116 to adjust the symbol information sets to compensate for distortions and alterations that may have occurred during the transfer from the transmitter to the receiver. The manner in which the compensation factors are determined will be elaborated upon in a later section.

It takes time for the compensator 114 to derive/compute the compensation factors. It is the responsibility of the delay mechanism 112 to delay the symbol information sets to give the compensator 114 the time that it needs. In one embodiment, the delay mechanism 112 is capable of imposing one of two delays. Which delay is imposed depends upon the mode in which the transmitter and receiver are operating. In normal mode, the transmitter sends the RF signals out using just one antenna. It has been observed that, in normal mode, 256 chip times is sufficient to derive/compute the compensation factors. Thus, if the transmitter and receiver are operating in normal mode, the delay mechanism 112 imposes a delay of 256 chip times. In diversity mode, the transmitter sends the RF signals out using multiple antennas. It has been observed that 512 chip times is sufficient to derive/compute the compensation factors in diversity mode. Thus, if the transmitter and receiver are operating in diversity mode, the delay mechanism 112 imposes a delay of 512 chip times.

In one embodiment, the compensator 114 derives/computes the channel compensation factor and the antenna compensation factor using different inputs and algorithms. In one embodiment, to derive/compute the channel compensation factor, the compensator 114 obtains input from a common pilot channel (CPICH). More specifically, in normal mode, the compensator 114 receives and uses one set of symbol information from the CPICH to derive/compute the channel compensation factor. In diversity mode, the compensator 114 receives and uses two sets of symbol information from the CPICH to derive/compute the channel compensation factor. Under the current WCDMA standard, the spreading factor imposed on the CPICH is a constant 256. With this spreading factor, it takes 256 chip times to read one set of symbol information from the CPICH, and 512 chip times to read two sets of symbol information. For at least this reason, the delay mechanism 112 imposes a delay of 256 chip times in normal mode (to allow for one set of symbol information to be read from the CPICH), and imposes a delay of 512 chip times in diversity mode (to allow for two sets of symbol information to be read from the CPICH). If the spreading factor of the CPICH is changed, the delay imposed by the delay mechanism 112 may be changed accordingly. For example, if the spreading factor of the CPICH is changed to 128, then the delays imposed by the delay mechanism 112 may be changed to 128 chip times for normal mode and 256 chip times for diversity mode. These and other modifications may be made within the spirit of the present invention.

To derive/compute the antenna compensation factor, the compensator 114 uses input from the CPICH and a dedicated physical channel (DPCH), which is a data channel for a dedicated user. In one embodiment, the antennal compensation factor is derived/computed only when the transmitter and receiver are operating in diversity mode. It has been observed that 512 chip times is sufficient for the compensator 114 to derive/compute the antenna compensation factor. Since 512 chip times is sufficient to derive both the channel compensation factor and the antenna compensation factor, the delay buffer 112 imposes a 512 chip times delay in diversity mode.

After the symbol information sets are delayed by the delay mechanism 112, the delayed symbol information sets are provided, along with the compensation factors, to the TXD decoder 116. In turn, the TXD decoder 116 processes the delayed symbol information sets with the compensation factors to derive a set of compensated symbol information sets. These compensated symbol information sets should closely resemble the symbol information sets that were processed by the transmitter prior to transmission. Once derived, the compensated symbol information sets are passed on to other parts of the receiver for further processing. In this manner, receiver portion 100 transforms a set of RF signals into compensated symbol information sets (which represent data) that can be used by other parts of the receiver.

Delay Mechanism

As shown in FIG. 1, delay mechanism 112 receives a stream of symbol information sets from the de-spreader 108. As noted previously, the de-spreader 108 may apply different spreading factors to different frames. Thus, the rate at which the symbol information sets are received by the delay mechanism 112 may differ from frame to frame. For example, if a spreading factor of 4 was applied by the de-spreader 108 to a frame, then it means that 9600 symbol information sets will be received by the delay mechanism 112 during that frame. Since a frame is 38,400 chip times in duration, the information rate for that frame will be 9600/38,400 or one symbol information set per every four chip times. On the other hand, if a spreading factor of 256 was applied by the de-spreader 108 to a frame, then it means that 150 symbol information sets will be received by the delay mechanism 112 during that frame. The information rate for that frame will be 150/38,400 or one symbol information set per every 256 chip times. As this example illustrates, the information rate at which the symbol information sets are received by the delay mechanism 112 may differ greatly from frame to frame. The delay mechanism 112 needs to be able to receive the symbol information sets at these varying rates, and still be able to impose consistent delays on them.

Figure 2:
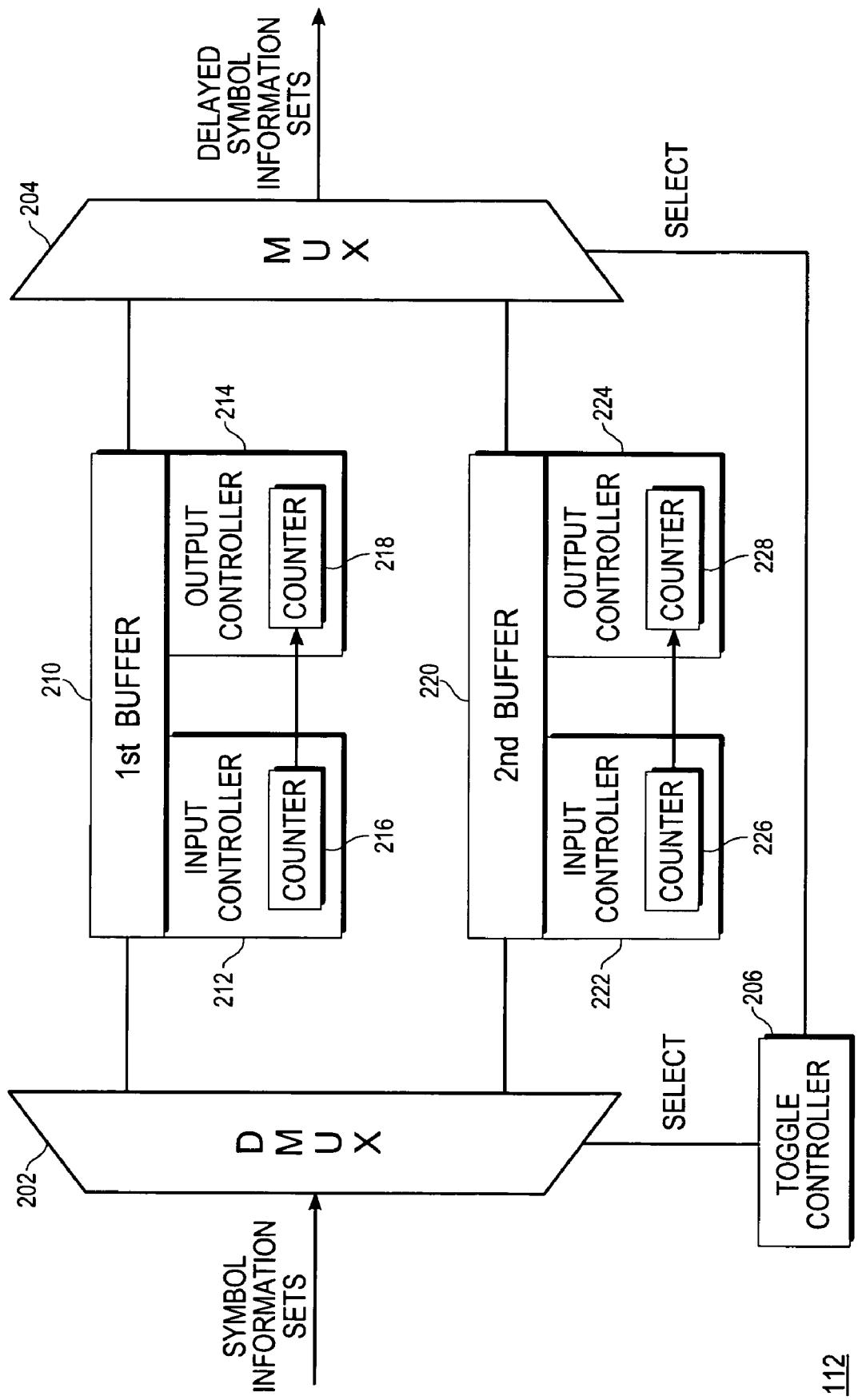
FIG. 2 shows a component diagram of a delay mechanism, in accordance with one embodiment of the present invention.

FIG. 2 shows a delay mechanism 112 that is capable of doing this, in accordance with one embodiment of the present invention. As shown, the delay mechanism 112 comprises two separate and independent buffers 210, 220. Each buffer 210, 220 is used during certain time periods to store symbol information sets received from the stream of symbol information sets. Use of the buffers is alternating. Thus, in a first time period, the first buffer 210 is used to store all of the symbol information sets received during that time period. In a second time period that follows the first time period, the second buffer 220 is used to store all of the symbol information sets received during that time period. In a third time period that follows the second time period, the first buffer 210 is used again to store all of the symbol information sets received during that time period, and in a fourth time period that follows the third time period, the second buffer 220 is used again to store all of the symbol information sets received during that time period. This alternating use of the buffers 210, 220 is repeated for all time periods.

In one embodiment, the time period during which each buffer 210, 220 is used to store symbol information sets has a duration of 256 chip times. This means that each buffer 210, 220 is used for 256 chip times at a time. Thus, for example, during a first 256 chip times, the first buffer 210 is used to store all of the symbol information sets received during that time. During the next 256 chip times, the second buffer 220 is used to store all of the symbol information sets received during that time. During the next 256 chip times, the first buffer 210 is used again, and during the next 256 chip times, the second buffer 220 is used again, and so on. This duration of 256 chip times per time period has been chosen because it is sufficiently short that, if the start of the 256 chip times is synchronized properly, it is guaranteed that a frame boundary (at which the spreading factor, and hence, the information rate can change) will not occur in the middle of (i.e. during) a time period. A frame boundary may occur between time periods, but it will not occur during a time period. Because of this, it is guaranteed that the buffers 210, 220 will not be required to store symbol information sets at different rates during the same time period. Put another way, a buffer 210, 220 will not encounter a situation where it is required to store symbol information sets at an information rate of R during a first part of a time period and an information rate of R' during the latter part of that same time period. Because of this guarantee, the control of each buffer 210, 220 can be made much simpler. In one embodiment, the duration (256 chip times) of each time period is equal to the spreading factor (256) of the CPICH.

Each buffer 210, 220 comprises a plurality of storage locations, with each storage location capable of storing one set of symbol information (which may comprise multiple bits). Since each time period is 256 chip times in duration, and since 4 is the lowest spreading factor allowed in the WCDMA standard, a maximum of 64 (256/4) symbol information sets may be stored into a buffer 210, 220 during a single time period. Thus, in one embodiment, each buffer 210, 220 has at least 64 storage locations. Depending upon the spreading factor, some of these storage locations may not be used during a particular time period. For example, if the spreading factor is 64, thereby meaning that only 4 symbol information sets will be received during a time period, then only the first four storage locations will be used during that time period.

To control the storing and outputting of symbol information sets, each buffer 210, 220 has an associated input controller and an output controller. Specifically, the first buffer 210 has input controller 212 and output controller 214. Likewise, the second buffer 220 has input controller 222 and output controller 224. In one embodiment, the input controllers 212, 222 operate independently of the output controllers 214, 224. Thus, the storing of information into a buffer and the outputting of information from a buffer are independently controlled.

When a buffer 210, 220 is used to store symbol information sets during a time period, it is not known at the outset how many sets of information will be stored into the buffer during that time period. Thus, as symbol information sets are stored into a buffer 210, 220, an input controller 212, 222 maintains a count (stored within a counter 216, 226) of how many symbol information sets have been stored into the buffer. At the end of the time period, the input controller 212, 222 provides this count to its corresponding output controller 214, 224, and more specifically, to the counter 218, 228 within the corresponding output controller 214, 224. The output controller 214, 224 then can use this count to determine how many sets of symbol information to read out of the buffer 210, 220.

In one embodiment, each input controller 212, 222 and each output controller 214, 224 has a chip time counting mechanism. This chip time counting mechanism is used to determine when certain actions should start and when certain actions should stop. For example, each input controller 212, 222 uses its chip time counting mechanism to count to 256 chip times. At the end of 256 chip times, the input controller 212, 222 knows to stop storing symbol information sets into its corresponding buffer 210, 220. Similarly, each output controller 214, 224 uses its chip time counting mechanism to know when to start reading symbol information sets out of its corresponding buffer 210, 220. In normal mode, the output controller 214, 224 begins reading out symbol information sets after 256 chip times. In diversity mode, the output controller 214, 224 begins reading out symbol information sets after 512 chip times. The operation of the input and output controllers will be described in greater detail in a later section. For purposes of the present invention, the input controllers 212, 222 and output controllers 214, 224 may be implemented using hardware logic components, software (i.e. one or more processors executing instructions), or any combination thereof.

To control the flow of information into and out of the two buffers 210, 220, the delay mechanism 112 further comprises a demultiplexer (DMUX) 202, a multiplexer (MUX) 204, and a toggle controller 206. The DMUX 202 receives the stream of symbol information sets from the de-spreader 108, and can direct the stream to either the first buffer 210 or the second buffer 220. By sending the proper select signal, the toggle controller 206 can control the DMUX 202 to control which buffer 210, 220 receives the stream of symbol information sets. In one embodiment, the toggle controller 206 toggles the select signal every 256 chip times so that each buffer 210, 220 receives the stream of symbol information sets every other 256 chip time period.

The MUX 204 determines which buffer 210, 220 is allowed to send its output to the output of the delay mechanism 112. The MUX 204 is coupled to receive the outputs of the buffers 210, 220. By sending the proper select signal, the toggle controller 206 can control the MUX 204 to control which buffer 210, 220 is allowed to send its output to the output of the delay mechanism 112. In one embodiment, the toggle controller 206 toggles the select signal every 256 chip times so that each buffer 210, 220 is able to send its output to the output of the delay mechanism 112 every other 256 chip time period.

As noted previously, the delay mechanism 112 is capable of imposing one of two different delays: 256 chip times or 512 chip times (depending upon whether the receiver is operating in normal mode or diversity mode). In one embodiment, in normal mode, the toggling of the DMUX 202 and MUX 204 are out of phase. That is, while the DMUX 202 is directing the stream of symbol information sets to the first buffer 210, the MUX 204 is allowing the second buffer 220 to send its output to the output of the delay mechanism 112. Similarly, while the DMUX 202 is directing the stream of symbol information sets to the second buffer 220, the MUX 204 is allowing the first buffer 210 to send its output to the output of the delay mechanism 112. In diversity mode, the toggling of the DMUX 202 and MUX 204 are in phase. That is, while the DMUX 202 is directing the stream of symbol information sets to the first buffer 210, the MUX 204 is allowing the first buffer 210 to send its output to the output of the delay mechanism 112. While the DMUX 202 is directing the stream of symbol information sets to the second buffer 220, the MUX 204 is allowing the second buffer 220 to send its output to the output of the delay mechanism 112. The operation of the DMUX 202, MUX 204, and toggle controller 206 will be elaborated upon in a later section. For purposes of the present invention, the toggle controller 206 may be implemented using hardware logic components, software (i.e. one or more processors executing instructions), or any combination thereof.

Operational Overview

Figure 3:
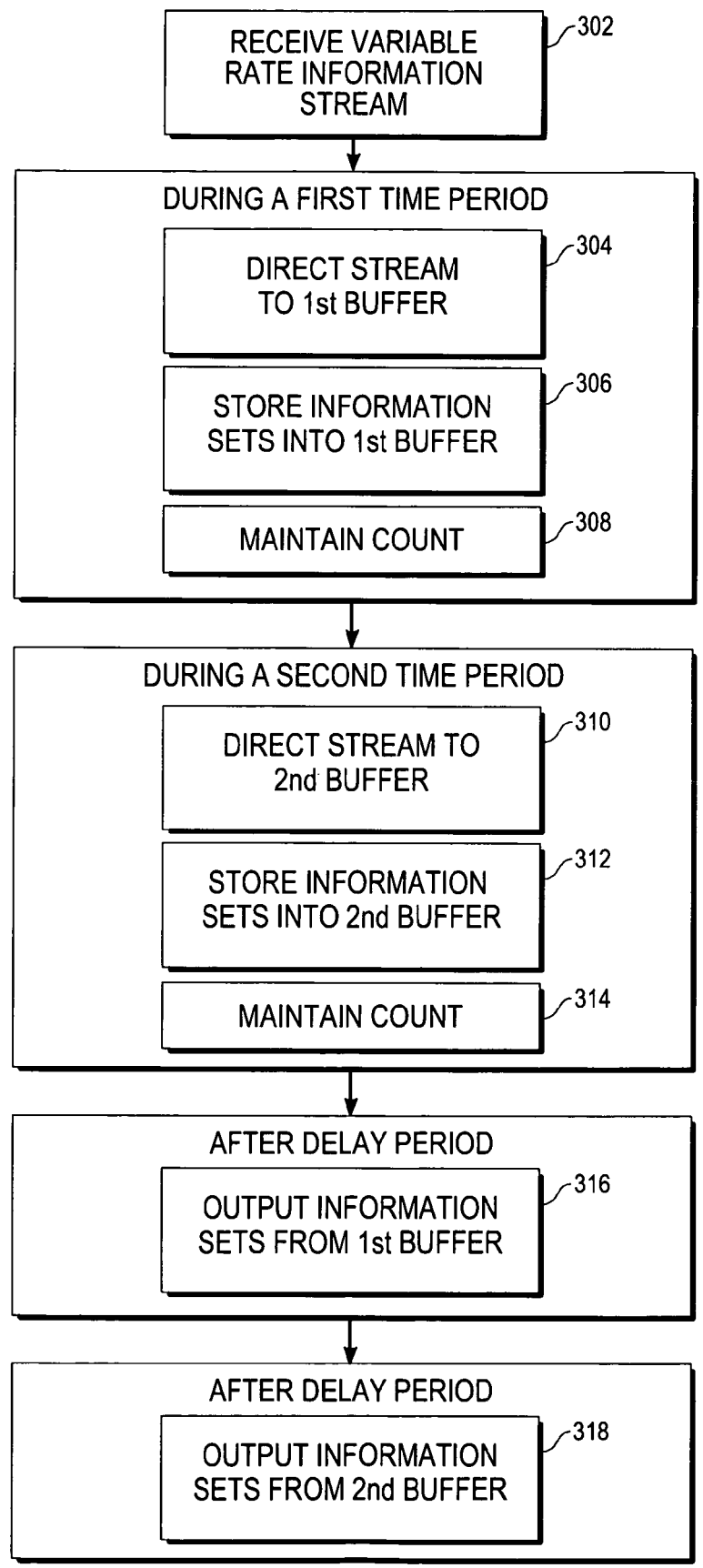
FIG. 3 is a flow diagram which shows an operational overview of a delay mechanism, in accordance with one embodiment of the present invention.

FIG. 3 shows a flow diagram that depicts an operational overview of the delay mechanism 112, in accordance with one embodiment of the present invention. As shown in FIG. 3, the delay mechanism 112 operates by initially receiving (block 302) a stream of symbol information sets that can have a variable information rate. During a first time period, the stream is directed (block 304) to a first buffer 210. The first buffer 210 stores (block 306) all of the symbol information sets that it receives during the first time period. As the symbol information sets are stored, a count is maintained (block 308) of the number (m) of symbol information sets that were stored into the first buffer 210 during the first time period.

Then, during a second time period, the stream is directed (block 310) to a second buffer 220. The second buffer 220 stores (block 312) all of the symbol information sets that it receives during the second time period. As the symbol information sets are stored, a count is maintained (block 314) of the number (n) of symbol information sets that were stored into the second buffer 220 during the second time period. Because the information rate of the stream may change between the two time periods, the number m of symbol information sets stored into the first buffer 210 during the first time period may be different than the number n of symbol information sets stored into the second buffer 220 during the second time period.

At some point, after a certain delay period has elapsed since the beginning of the first time period, the m number of information sets stored into the first buffer 210 during the first time period are outputted (block 316) from the first buffer. In addition, after the same delay period has elapsed since the beginning of the second time period, the n number of information sets stored into the second buffer 220 during the second time period are outputted (block 318) from the second buffer. In this manner, a consistent delay is imposed on the symbol information sets of both buffers, despite the fact that the information sets may have been received at different information rates.

The above discussion provides an overview of the operation of the delay mechanism 112. To show how the various components of the delay mechanism 112 interact to achieve this overall operation, detailed operational descriptions will now be provided. In the following discussions, the operation of the delay mechanism 112 in normal mode and in diversity mode will be described in that order.

Operation in Normal Mode

In normal mode, the delay mechanism 112 imposes a delay of 256 chip times. In this mode, the delay mechanism 112 of FIG. 2 operates as follows. Initially, the toggle controller 206 sends a "0" select signal to the DMUX 202 to cause the DMUX 202 to direct the stream of symbol information sets to the first buffer 210. This signals the beginning of a first time period. At this point, the input controller 212 zeros out its counter 216, and both the input controller 212 and output controller 214 begin counting chip times. During the first time period, the input controller 212 causes the first buffer 210 to store all of the symbol information sets that it receives from the stream. As each symbol information set is stored into the first buffer 210, the input controller 212 increments the counter 216. Thus, the input controller 212 maintains a count of how many (m) symbol information sets have been stored into the first buffer 210 in the first time period. For the sake of example, it will be assumed that 4 symbol information sets are stored into the first buffer 210 in the first time period. These 4 sets of information are stored into the first 4 storage locations of the first buffer 210.

At some point, 256 chip times will have been counted. When that happens, a number of events take place. First, the input controller 212 stops causing the first buffer 210 to store symbol information sets (since the first time period is now over). Also, the input controller 212 transfers the count in its counter 216 to the counter 218 of the output controller 214. In addition, the output controller 214, realizing that 256 chip times have elapsed since the beginning of the first time period, begins to output the symbol information sets stored within the first buffer 210 to the MUX 204. In the current example, the value in counter 218 is 4; thus, the output controller 214 knows to read information sets out of the first 4 storage locations of the first buffer 210. As each information set is read out, the value in counter 218 is decremented until it reaches zero. At that point, all of the information sets will have been read out. In one embodiment, the reading of information sets from the first buffer 210 is carried out at a much higher rate than the writing of information sets into the first buffer 210. Furthermore, to enable the output of the first buffer 210 to reach the output of the MUX 204, the toggle controller 206 sends a "0" select signal to the MUX 204 to cause the MUX 204 to couple the output of the first buffer 210 to the output of the MUX 204. Yet further, the toggle controller 206 sends a "1" select signal to the DMUX 202 to cause the DMUX 202 to direct the stream of symbol information sets to the second buffer 220. This signals the beginning of a second time period.

At the beginning of the second time period, the input controller 222 zeros out its counter 226, and both the input controller 222 and output controller 224 begin counting chip times. During the second time period, the input controller 222 causes the second buffer 220 to store all of the symbol information sets that it receives from the stream. As each symbol information set is stored into the second buffer 220, the input controller 222 increments the counter 226. Thus, the input controller 222 maintains a count of how many (n) symbol information sets have been stored into the second buffer 220 in the second time period. For the sake of example, it will be assumed that a frame boundary occurred between the first and second time periods, and that the new frame caused the information rate to change. Thus, it will be assumed that 8 symbol information sets are stored into the second buffer 220 in the second time period. These 8 sets of information are stored into the first 8 storage locations of the second buffer 220.

At some point, another 256 chip times will have been counted. When that happens, a number of events take place. First, the input controller 222 stops causing the second buffer 220 to store symbol information sets (since the second time period is now over). Also, the input controller 222 transfers the count in its counter 226 to the counter 228 of the output controller 224. In addition, the output controller 224, realizing that 256 chip times have elapsed since the beginning of the second time period, begins to output the symbol information sets stored within the second buffer 220 to the MUX 204. In the current example, the value in counter 228 is 8; thus, the output controller 224 knows to read information sets out of the first 8 storage locations of the second buffer 220. As each information set is read out, the value in counter 228 is decremented until it reaches zero. At that point, all of the information sets will have been read out. In one embodiment, the reading of information sets from the second buffer 220 is carried out at a much higher rate than the writing of information sets into the second buffer 220. Furthermore, to enable the output of the second buffer 220 to reach the output of the MUX 204, the toggle controller 206 sends a "1" select signal to the MUX 204 to cause the MUX 204 to couple the output of the second buffer 220 to the output of the MUX 204. Yet further, the toggle controller 206 sends a "0" select signal to the DMUX 202 to cause the DMUX 202 to direct the stream of symbol information sets to the first buffer 220 again. This signals the beginning of a third time period. At that point, the operation of the delay mechanism 112, as described above, repeats.

Operation in Diversity Mode

In diversity mode, the delay mechanism 112 imposes a delay of 512 chip times. In this mode, the delay mechanism 112 of FIG. 2 operates as follows. Initially, the toggle controller 206 sends a "0" select signal to the DMUX 202 to cause the DMUX 202 to direct the stream of symbol information sets to the first buffer 210. This signals the beginning of a first time period. At this point, the input controller 212 zeros out its counter 216, and both the input controller 212 and output controller 214 begin counting chip times. During the first time period, the input controller 212 causes the first buffer 210 to store all of the symbol information sets that it receives from the stream. As each symbol information set is stored into the first buffer 210, the input controller 212 increments the counter 216. Thus, the input controller 212 maintains a count of how many (m) symbol information sets have been stored into the first buffer 210 in the first time period. For the sake of example, it will be assumed that 4 symbol information sets are stored into the first buffer 210 in the first time period. These 4 sets of information are stored into the first 4 storage locations of the first buffer 210.

At some point, 256 chip times will have been counted. When that happens, a number of events take place. First, the input controller 212 stops causing the first buffer 210 to store symbol information sets (since the first time period is now over). Also, the input controller 212 transfers the count in its counter 216 to the counter 218 of the output controller 214. Yet further, the toggle controller 206 sends a "1" select signal to the DMUX 202 to cause the DMUX 202 to direct the stream of symbol information sets to the second buffer 220. This signals the beginning of a second time period. Notice that by the end of the first time period, the output controller 218 has not yet counted 512 chip times. Thus, it does not cause any of the information sets stored within the first buffer 210 to be outputted.

At the beginning of the second time period, the input controller 222 zeros out its counter 226, and both the input controller 222 and output controller 224 begin counting chip times. During the second time period, the input controller 222 causes the second buffer 220 to store all of the symbol information sets that it receives from the stream. As each symbol information set is stored into the second buffer 220, the input controller 222 increments the counter 226. Thus, the input controller 222 maintains a count of how many (n) symbol information sets have been stored into the second buffer 220 in the second time period. For the sake of example, it will be assumed that a frame boundary occurred between the first and second time periods, and that the new frame caused the information rate to change. Thus, it will be assumed that 8 symbol information sets are stored into the second buffer 220 in the second time period. These 8 sets of information are stored into the first 8 storage locations of the second buffer 220.

At some point, another 256 chip times will have been counted. When that happens, a number of events take place. First, the input controller 222 stops causing the second buffer 220 to store symbol information sets (since the second time period is now over). Also, the input controller 222 transfers the count in its counter 226 to the counter 228 of the output controller 224. In addition, the output controller 214 of the first buffer 210, realizing that 512 chip times have now elapsed since the beginning of the first time period, begins to output the symbol information sets stored within the first buffer 210 to the MUX 204. In the current example, the value in counter 218 is 4; thus, the output controller 214 knows to read information sets out of the first 4 storage locations of the first buffer 210. As each information set is read out, the value in counter 218 is decremented until it reaches zero. At that point, all of the information sets will have been read out. In one embodiment, the reading of information sets from the first buffer 210 is carried out at a much higher rate than the writing of information sets into the first buffer 210. Furthermore, to enable the output of the first buffer 210 to reach the output of the MUX 204, the toggle controller 206 sends a "0" select signal to the MUX 204 to cause the MUX 204 to couple the output of the first buffer 210 to the output of the MUX 204. Yet further, the toggle controller 206 sends a "0" select signal to the DMUX 202 to cause the DMUX 202 to direct the stream of symbol information sets to the first buffer 220 again. This signals the beginning of a third time period. Notice that by the end of the second time period, the output controller 228 of the second buffer 220 has not yet counted 512 chip times. Thus, it does not cause any of the information sets stored within the second buffer 220 to be outputted.

At the beginning of the third time period, the input controller 212 zeros out its counter 216, and both the input controller 212 and output controller 214 begin counting chip times again. During the third time period, the input controller 212 causes the first buffer 210 to store all of the symbol information sets that it receives from the stream. As each symbol information set is stored into the first buffer 210, the input controller 212 increments the counter 216.

At some point, another 256 chip times will have been counted. When that happens, a number of events take place. First, the input controller 212 stops causing the first buffer 210 to store symbol information sets (since the third time period is now over). Also, the input controller 212 transfers the count in its counter 216 to the counter 218 of the output controller 214. In addition, the output controller 224 of the second buffer 220, realizing that 512 chip times have now elapsed since the beginning of the second time period, begins to output the symbol information sets stored within the second buffer 220 to the MUX 204. In the current example, the value in counter 228 is 8; thus, the output controller 224 knows to read information sets out of the first 8 storage locations of the second buffer 220. As each information set is read out, the value in counter 228 is decremented until it reaches zero. At that point, all of the information sets will have been read out. In one embodiment, the reading of information sets from the second buffer 220 is carried out at a much higher rate than the writing of information sets into the second buffer 220. Furthermore, to enable the output of the second buffer 220 to reach the output of the MUX 204, the toggle controller 206 sends a "1" select signal to the MUX 204 to cause the MUX 204 to couple the output of the second buffer 220 to the output of the MUX 204. Yet further, the toggle controller 206 sends a "1" select signal to the DMUX 202 to cause the DMUX 202 to direct the stream of symbol information sets to the second buffer 220 again. This signals the beginning of a fourth time period. At that point, the operation of the delay mechanism 112, as described above, repeats.

At this point, it should be noted that although the invention has been described with reference to a specific embodiment, it should not be construed to be so limited. Various modifications may be made by those of ordinary skill in the art with the benefit of this disclosure without departing from the spirit of the invention. For example, while the duration of a time period has been disclosed as being 256 chip times, it should be noted that other durations may be used, if so desired. Likewise, while the delay periods imposed by the delay mechanism have been disclosed as being 256 chip times and 512 chip times, it should be noted that other delays may be imposed, if so desired. These and other modifications are within the scope of the present invention. Thus, the invention should not be limited by the specific embodiments used to illustrate it but only by the scope of the issued claims.

What is claimed is:

1. A method, comprising:
    receiving a stream of information sets, wherein the stream has a variable information rate that can change from time period to time period such that more information sets may be received in one time period than another;
    during a first time period:
        directing the stream of information sets to a first buffer;
        storing within the first buffer all of the information sets received from the stream during the first time period;
        maintaining a first count (m) of how many information sets were stored within the first buffer during the first time period;
    during a second time period which immediately follows the first time period:
        directing the stream of information sets to a second buffer;
        storing within the second buffer all of the information sets received from the stream during the second time period;
        maintaining a second count (n) of how many information sets were stored within the second buffer during the second time period;
    after a delay period has elapsed since the beginning of the first time period:
        outputting from the first buffer the m number of information sets that were stored within the first buffer during the first time period; and
    after a delay period has elapsed since the beginning of the second time period:
        outputting from the second buffer the n number of information sets that were stored within the second buffer during the second time period.

2. The method of claim 1, wherein the stream has a different information rate during the second time period than during the first time period so that the number m of information sets stored into the first buffer during the first time period is different than the number n of information sets stored into the second buffer during the second time period.

3. The method of claim 2, wherein the first and second time periods have the same duration.

4. The method of claim 3, wherein the duration of the first and second time periods is sufficiently short to ensure that the stream will not change information rates during the first time period or the second time period.

5. The method of claim 3, wherein a particular channel carries information that can be used to compute a set of compensation information, wherein the particular channel has a particular spreading factor associated therewith, and wherein the delay period has a duration that is determined based upon the particular spreading factor.

6. The method of claim 3, wherein the delay period has a duration, and wherein the duration of the delay period is the same as the duration of the first and second time periods.

7. The method of claim 3, wherein the delay period has a duration, and wherein the duration of the delay period is twice the duration of the first and second time periods.

8. The method of claim 1, wherein the stream is not directed to the second buffer during the first time period so that no information sets are stored into the second buffer during the first time period, and wherein the stream is not directed to the first buffer during the second time period so that no information sets are stored into the first buffer during the second time period.

9. The method of claim 1, wherein the m number of information sets are stored in the first m storage locations of the first buffer, wherein the m number of information sets are outputted from the first m storage locations of the first buffer, wherein the n number of information sets are stored in the first n storage locations of the second buffer, and wherein the n number of information sets are outputted from the first n storage locations of the second buffer.

10. The method of claim 9, wherein the first buffer has an x number of storage locations, where x is greater than m, and wherein the storage locations of the first buffer beyond the $m^{th}$ storage location are not written into prior to outputting the m number of information sets from the first m storage locations of the first buffer.

11. The method of claim 10, wherein the second buffer has a y number of storage locations, where y is greater than n, and wherein the storage locations of the second buffer beyond the $n^{th}$ storage location are not written into prior to outputting the n number of information sets from the first n storage locations of the second buffer.

12. The method of claim 1, further comprising:
    de-scrambling a set of signals in accordance with a scrambling code to derive a set of descrambled information sets; and
    de-spreading the set of descrambled information sets in accordance with a variable spreading factor to derive the stream of information sets.

13. The method of claim 12, further comprising:
    computing a set of channel compensation information; and
    processing the set of channel compensation information to derive a set of one or more channel compensation factors.

14. The method of claim 13, further comprising:
    processing the m number of information sets outputted from the first buffer and the n number of information sets outputted from the second buffer with the set of channel compensation factors to derive one or more compensated information sets.

15. The method of claim 13, further comprising:
    computing a set of antenna compensation information; and
    processing the set of antenna compensation information to derive a set of one or more antenna compensation factors.

16. The method of claim 15, further comprising:
    processing the m number of information sets outputted from the first buffer and the n number of information sets outputted from the second buffer with the set of channel compensation factors and the set of antenna compensation factors to derive one or more compensated information sets.

17. An apparatus, comprising:
    a first buffer;

a second buffer;

means for receiving a stream of information sets, wherein the stream has a variable information rate that can change from time period to time period such that more information sets may be received in one time period than another;

means for directing, during a first time period, the stream of information sets to the first buffer;

means for causing the first buffer to store all of the information sets received from the stream during the first time period;

means for maintaining a first count (m) of how many information sets were stored within the first buffer during the first time period;

means for directing, during a second time period which immediately follows the first time period, the stream of information sets to the second buffer;

means for causing the second buffer to store all of the information sets received from the stream during the second time period;

means for maintaining a second count (n) of how many information sets were stored within the second buffer during the second time period;

means for causing, after a delay period has elapsed since the beginning of the first time period, the m number of information sets that were stored within the first buffer during the first time period to be outputted from the first buffer; and means for causing, after a delay period has elapsed since the beginning of the second time period, the n number of information sets that were stored within the second buffer during the second time period to be outputted from the second buffer.

18. The apparatus of claim 17, wherein the stream has a different information rate during the second time period than during the first time period so that the number m of information sets stored into the first buffer during the first time period is different than the number n of information sets stored into the second buffer during the second time period.

19. The apparatus of claim 18, wherein the first and second time periods have the same duration.

20. The apparatus of claim 19, wherein the duration of the first and second time periods is sufficiently short to ensure that the stream will not change information rates during the first time period or the second time period.

21. The apparatus of claim 19, wherein a particular channel carries information that can be used to compute a set of compensation information, wherein the particular channel has a particular spreading factor associated therewith, and wherein the delay period has a duration that is determined based upon the particular spreading factor.

22. The apparatus of claim 19, wherein the delay period has a duration, and wherein the duration of the delay period is the same as the duration of the first and second time periods.

23. The apparatus of claim 19, wherein the delay period has a duration, and wherein the duration of the delay period is twice the duration of the first and second time periods.

24. The apparatus of claim 17, wherein the stream is not directed to the second buffer during the first time period so that no information sets are stored into the second buffer during the first time period, and wherein the stream is not directed to the first buffer during the second time period so that no information sets are stored into the first buffer during the second time period.

25. The apparatus of claim 17, wherein the m number of information sets are stored in the first m storage locations of the first buffer, wherein the m number of information sets are outputted from the first m storage locations of the first buffer, wherein the n number of information sets are stored in the first n storage locations of the second buffer, and wherein the n number of information sets are outputted from the first n storage locations of the second buffer.

26. The apparatus of claim 25, wherein the first buffer has an x number of storage locations, where x is greater than m, and wherein the storage locations of the first buffer beyond the $m^{th}$ storage location are not written into prior to outputting the m number of information sets from the first m storage locations of the first buffer.

27. The apparatus of claim 26, wherein the second buffer has a y number of storage locations, where y is greater than n, and wherein the storage locations of the second buffer beyond the $n^{th}$ storage location are not written into prior to outputting the n number of information sets from the first n storage locations of the second buffer.

28. The apparatus of claim 17, further comprising:

means for de-scrambling a set of signals in accordance with a scrambling code to derive a set of descrambled information sets; and means for de-spreading the set of descrambled information sets in accordance with a variable spreading factor to derive the stream of information sets.

29. The apparatus of claim 28, further comprising:

means for computing a set of channel compensation information; and means for processing the set of channel compensation information to derive a set of one or more channel compensation factors.

30. The apparatus of claim 29, further comprising:

means for processing the m number of information sets outputted from the first buffer and the n number of information sets outputted from the second buffer with the set of channel compensation factors to derive one or more compensated information sets.

31. The apparatus of claim 29, further comprising:

means for computing a set of antenna compensation information; and means for processing the set of antenna compensation information to derive a set of one or more antenna compensation factors.

32. The apparatus of claim 31, further comprising:

means for processing the m number of information sets outputted from the first buffer and the n number of information sets outputted from the second buffer with the set of channel compensation factors and the set of antenna compensation factors to derive one or more compensated information sets.

33. A method, comprising:

receiving a stream of information sets, wherein the stream has a variable information rate that can change from time period to time period such that more information sets may be received in one time period than another;

during a first time period:

directing the stream of information sets to a first buffer;

storing within the first buffer all of the information sets received from the stream during the first time period;

maintaining a first count (m) of how many information sets were stored within the first buffer during the first time period;

during a second time period which immediately follows the first time period:

directing the stream of information sets to a second buffer;

storing within the second buffer all of the information sets received from the stream during the second time period;

maintaining a second count (n) of how many information sets were stored within the second buffer during the second time period;

after a delay period has elapsed since the beginning of the first time period:

outputting from the first buffer the m number of information sets that were stored within the first buffer during the first time period; and after a delay period has elapsed since the beginning of the second time period:

outputting from the second buffer the n number of information sets that were stored within the second buffer during the second time period;

wherein the duration of the first time period and the duration of the second time period are sufficiently short to ensure that the stream will not change information rates during the first time period or the second time period.

34. An apparatus, comprising:

a first buffer;

a second buffer;

means for receiving a stream of information sets, wherein the stream has a variable information rate that can change from time period to time period such that more information sets may be received in one time period than another;

means for directing, during a first time period, the stream of information sets to the first buffer;

means for causing the first buffer to store all of the information sets received from the stream during the first time period;

means for maintaining a first count (m) of how many information sets were stored within the first buffer during the first time period;

means for directing, during a second time period which immediately follows the first time period, the stream of information sets to the second buffer;

means for causing the second buffer to store all of the information sets received from the stream during the second time period;

means for maintaining a second count (n) of how many information sets were stored within the second buffer during the second time period;

means for causing, after a delay period has elapsed since the beginning of the first time period, the m number of information sets that were stored within the first buffer during the first time period to be outputted from the first buffer; and means for causing, after a delay period has elapsed since the beginning of the second time period, the n number of information sets that were stored within the second buffer during the second time period to be outputted from the second buffer;

wherein the duration of the first time period and the duration of the second time period are sufficiently short to ensure that the stream will not change information rates during the first time period or the second time period.

* * * * *